US00RE35521E

United States Patent [19]

Mizuhara

[11] E Patent Number: Re. 35,521

[45] Reissued Date of Patent: May 27, 1997

[54] BRAZING ALLOY OF COPPER, SILICON, TITANIUM, ALUMINUM

[75] Inventor: Howard Mizuhara, Hillsborough, Calif.

[73] Assignee: The Morgan Crucible Company plc, Madeira Walk, United Kingdom

[21] Appl. No.: 195,314

[22] Filed: Feb. 10, 1994

Related U.S. Patent Documents

Reissue of:

[64] Patent No.: 5,087,416
Issued: Feb. 11, 1992
Appl. No.: 420,416
Filed: Oct. 12, 1989

[51] Int. Cl.[6] ..... C22C 9/00

[52] U.S. Cl. ..... 420/489; 228/262.61; 228/262.8

[58] Field of Search ..... 420/489; 148/436; 228/262.61, 262.6, 262.7, 262.8

[56] References Cited

U.S. PATENT DOCUMENTS

| | | | |
|---|---|---|---|
| 3,993,479 | 11/1976 | Cheskis et al. | 148/432 |
| 4,599,119 | 7/1986 | Ikushima et al. | 420/492 |

FOREIGN PATENT DOCUMENTS

| | | |
|---|---|---|
| 62-050426 | 5/1987 | Japan . |
| 63-050439 | 3/1988 | Japan . |
| 278355 | 5/1928 | United Kingdom . |
| 1520721 | 2/1976 | United Kingdom . |

*Primary Examiner*—Deborah Yee
*Attorney, Agent, or Firm*—Dean W. Russell; Kilpatrick & Cody

[57] ABSTRACT

A brazing alloy for brazing ceramics has the following composition, in weight percent: 1 to 4 silicon; 1 to 5 titanium; 0.5 to 6 aluminum; 89 to 96 copper.

18 Claims, No Drawings

BRAZING ALLOY OF COPPER, SILICON, TITANIUM, ALUMINUM

Matter enclosed in heavy brackets [ ] appears in the original patent but forms no part of this reissue specification; matter printed in italics indicates the additions made by reissue.

This invention concerns a ternary brazing alloy of copper, silicon and titanium for brazing ceramics. Such a ternary alloy is disclosed in U.S. Pat. No. 4,426,033 and European Patent Application 0 038 584. U.S. Pat. No. 4,426,033 discloses a ternary alloy containing 50 to 98.75% by weight of copper, 0.25 to 5% titanium, and from about 1% to about 45% of a third metal selected from the group consisting of silicon, tin, germanium, magnanese, nickel and cobalt. EP application 0 038 584 discloses a ternary brazing alloy containing 40 to 85 atomic % copper, 5 to 60 atomic % titanium, 0 to 55 atomic % silicon.

A problem with the ternary brazing alloys disclosed in the above references is the formation of oxidation product on the braze fillet area during the direct brazing of ceramic to metal.

I have found that if a controlled amount of aluminum is added to a copper, silicon titanium brazing alloy of controlled composition, that the formation of oxidation product can be prevented or greatly minimized. A brazing alloy as per this invention has a composition of, in weight percent, 1 to 4 silicon, 1 to 5 titanium, 0.5 to 6 aluminum, 89 to 96 copper.

In the following examples, all compositions are expressed in weight percent.

EXAMPLE 1

An alloy with a compoition of 92.25% copper, 3.25% silicon, 2% aluminum, 2.5% titanium was tungsten arc melted on water-cooled copper hearth. The button was rolled down into 2 mil thickness foil.

The foil was placed between 1.2"×1.2"×0.060" thick alumina substrate and Kovar strip ¼" wide by 10 mil thick by 3" long. The assembly was brazed at 1050° C. under $10^{-5}$ torr vacuum. An excellent looking braze was obtained. Pulling of brazed Kovar strip using Instron at 2 inch per minute resulted in 20 pound force peel which is an excellent strength. The alloy with a hardness of 138 Knoop hardness number met or harness criteria. Kovar is a alloy of iron, cobalt and nickel made by Westinghouse Corporation.

An ASTM F-19 alumina tensile test piece was brazed with copper sandwich. That is, the assembly from bottom was alumina, 2 mil brazing alloy preform, 10 mil copper, 2nd brazing alloy preform and alumina. Ten sets were assembled and brazed to above schedule. All tested better than $10^{-9}$cc/second leak rate using He gas and helium mass spectrograph.

EXAMPLE 2

An alloy with a composition of 94.0% copper, 2.75% silicon, 1% aluminum, 2.25% titanium was melted and peel test prepared as in Example 1. An excellent bright gold colored braze resulted. Peel test showed that 25 pound force was required to pull off the Kovar tab from the alumina substrate.

EXAMPLE 3

As in Example 1, a button was prepared with a composition of 92.00% copper, 3.00% aluminum, 2.75% silicon, 2.25% titanium, and rolled into 2 mil foil.

Peel tests were prepared and also hermeticity samples were prepared. The assemblies were brazed under $10^{-5}$ torr vacuum and at 1050° C.

The peel test required 17 pound average pull on Kovar strip. The five (5) hermeticity test samples all passed the helium leak check.

EXAMPLE 4

An alloy with a composition of 90.25% copper, 5% aluminum, 2.25% silicon, 2.5% titanium was melted and rolled to 2 mil thickness foil as in Example 1. Peel test and hermeticity braze samples were prepared as in Example 1. It tested 16 lbs force to peel off Kovar from the alumina substrate. The hermeticity test showed that it met the $10^{-9}$ cc/sec. leak requirement.

EXAMPLE 5

A powder admixture consisting of 97.75% minus 325 mesh atomized alloy powder, with a composition 94.12% copper, 2.81% silicon, 3.07% aluminum is mixed with 2.25% titanium hydride minus 325 mesh powder. This combination results in a melted composition of 92.00% Cu, 3.00% Al, 2.75% Si, 2.25% Ti. A screening paste consisting of 90% of above admixture and 10% screening vehicle #235 from Ceramic Color Company was prepared.

Using 105 mesh screen, with the screen placed 0.050" above 1.2"×1.2"×0.060" thick alumina substrate as a snap off distance, the prepared paste was screened on to the alumina substrate and measured about 4 mil thick, dried, which is equivalent to 2 mil foil. Three strips of Kovar peel test strips, measuring 0.25"×3"×0.010" thick were placed over coated alumina substrate. The assemblies were brazed at 1050° C.×10 minutes under $10^{-5}$ torr vacuum furnace. The brazed layers between the strips were pin hole free.

The peel test resulted in 17 pound force to peel off the Kovar strip, which is equivalent to moly-metallized ceramic system.

In the following table, alloy compositions within this invention are in weight percent.

| | Composition | | | | | | | |
|---|---|---|---|---|---|---|---|---|
| Sample | Cu | Al | Si | Ti | Liquidus | Solidus | KHN | Peel |
| 83-13 | 94.00 | 1.0 | 2.75 | 2.25 | 1035 | 994 | 114 | 25 |
| 65-13 | 92.50 | 2.0 | 3.50 | 2.0 | 1000 | 967 | 140 | 11 |
| 65-16 | 92.25 | 2.0 | 3.25 | 2.50 | 1010 | 975 | 138 | 20 |
| 65-10 | 93.50 | 2.0 | 3.00 | 1.50 | 1021 | 983 | 13 | |
| 65-18 | 93.0 | 2.0 | 2.50 | 2.50 | 1036 | 995 | 115 | 18 |
| 83-16 | 93.75 | 2.0 | 2.00 | 2.25 | 1049 | 1003 | 101 | 20 |
| 65-2 | 91.25 | 3.0 | 3.25 | 2.50 | 1009 | 956 | 160 | 14 |
| 65-G | 92.00 | 3.0 | 3.00 | 2.00 | 1013 | 968 | 144 | 15 |
| 65-3I | 92.00 | 3.0 | 2.75 | 2.25 | 1012 | 978 | 130 | 17 |
| 65-03 | 91.25 | 4.0 | 2.25 | 2.50 | 1022 | 990 | 148 | 14 |
| 65-04 | 90.25 | 5.0 | 2.25 | 2.50 | 1019 | 985 | 150 | 16 |
| 65-05 | 90.25 | 6.0 | 1.25 | 2.50 | 1032 | 1003 | 139 | 13 |

In the table, KHN is the Knoop hardness. Liquidus and solidus temperatures are in degrees Centigrade. Peel is the average peel strength in pounds.

I claim:

1. A brazing alloy for brazing ceramics having the following composition, in weight percent: 94 Cu, 2.75 Si, 1 Al, 2.25 Ti.

2. A brazing alloy for brazing ceramics having the following composition, in weight percent: 92.25 Cu, 3.25 Si, 2 Al, 2.5 Ti.

3. A brazing alloy for brazing ceramics having the following composition, in weight percent: 92 Cu, 2.75 Si, 3 Al, 2.25 Ti.

4. A brazing alloy for brazing ceramics having the following composition, in weight percent: 90.25 Cu, 2.25 Si, 5 Al, 2.5 Ti.

*5. A brazing alloy for brazing ceramics having a composition consisting essentially of, in weight percent: 90.25–94.0 Cu, 1.25–3.5 Si, 1.0–6.0 Al, 1.5–2.5 Ti.*

*6. The brazing alloy of claim 5 in which the brazing alloy composition is, in weight percent: 92.5 Cu, 2.0 Al, 3.5 Si, 2.0 Ti.*

*7. The brazing alloy of claim 5 in which the brazing alloy composition is, in weight percent: 93.5 Cu, 2.0 Al, 3.0 Si, 1.5 Ti.*

*8. The brazing alloy of claim 5 in which the brazing alloy composition is, in weight percent: 93.0 Cu, 2.0 Al, 2.5 Si, 2.5 Ti.*

*9. The brazing alloy of claim 5 in which the brazing alloy composition is, in weight percent: 93.75 Cu, 2.0 Al, 2.0 Si, 2.25 Ti.*

*10. The brazing alloy of claim 5 in which the brazing alloy composition is, in weight percent: 91.25 Cu, 3.0 Al, 3.25 Si, 2.5 Ti.*

*11. The brazing alloy of claim 5 in which the brazing alloy composition is, in weight percent: 92.0 Cu, 3.0 Al, 3.0 Si, 2.0 Ti.*

*12. The brazing alloy of claim 5 in which the brazing alloy composition is, in weight percent: 91.25 Cu, 4.0 Al, 2.25 Si, 2.5 Ti.*

*13. The brazing alloy of claim 5 in which the brazing alloy composition is, in weight percent: 90.25 Cu, 6.0 Al, 1.25 Si, 2.5 Ti.*

*14. The brazing alloy of claim 5 in which the alloy comprises a foil.*

*15. The brazing alloy of claim 5 in which the alloy comprises a paste.*

*16. A brazed joint having a first material comprising a ceramic, a second material selected from the group consisting of metals and ceramics, and a brazing alloy disposed between the first material and the second material having a composition consisting essentially of, in weight percent: 90.25–94.0 Cu, 1.25–3.5 Si, 1.0–6.0 Al, 1.5–2.5 Ti.*

*17. The brazed joint of claim 16 in which the brazing alloy comprises a foil.*

*18. A brazed joint having a first material comprising a ceramic, a second material selected from the group consisting of metals and ceramics, and a brazing material disposed between the first material and said second material, the brazing material comprising a powder admixture of 2.25% titanium hydride powder and 97.75% atomized powder having a composition consisting of, in weight percent: 94.12 Cu, 3.07 Al and 2.81 Si.*

* * * * *